United States Patent [19]

Ookubo et al.

[11] 4,364,608
[45] Dec. 21, 1982

[54] WHEEL COVER FOR A VEHICLE

[75] Inventors: Takao Ookubo, Yokohama; Yuko Baba, Tokyo; Kiyoshi Kamihama, Yokohama, all of Japan

[73] Assignees: Nissan Motor Co., Ltd.; Hashimoto Forming Kogyo Co., Ltd., both of Yokohama, Japan

[21] Appl. No.: 155,926

[22] Filed: Jun. 3, 1980

[30] Foreign Application Priority Data

Jun. 4, 1979 [JP] Japan .................. 54-68843

[51] Int. Cl.³ .............................................. B60B 7/00
[52] U.S. Cl. .................. 301/37 SS; 301/37 P
[58] Field of Search .......... 301/37 R, 37 SS, 37 P, 301/63 PW, 6 S; 29/159 A; 428/31; D12/204, 205

[56] References Cited

U.S. PATENT DOCUMENTS

| | | |
|---|---|---|
| 2,699,361 | 1/1955 | Jenkins .......................... 301/37 SS |
| 2,709,114 | 5/1955 | Plotkin . | |
| 2,713,516 | 7/1955 | Lyon . | |
| 2,725,258 | 11/1955 | Lyon .............................. 301/37 SS |
| 3,145,062 | 8/1964 | Jadd . | |
| 3,549,205 | 12/1970 | Reid ................................. 301/64 |
| 4,166,653 | 9/1979 | Claucherty . | |
| 4,275,930 | 6/1981 | Kamihama ................. 301/37 SS |

FOREIGN PATENT DOCUMENTS 54-102729  8/1979  Japan .......................... 301/37 SS Primary Examiner—H. Grant Skaggs

[57] ABSTRACT

A wheel cover for a vehicle comprises first and second cover members (1, 2) each including an outer and an inner peripheral portion (12, 13, 21, 22) and a plurality of spoke portions (14, 15, 24, 25). The portions of each cover member are integrally formed into a one-piece structure. The first and the second cover members are axially superimposed on each other leaving a space (S) between the respective spoke portions of the first and second cover members. The first and the second cover members are connected together such that the spoke portions (14, 15) of the cover member (1) which is axially on the rear side are visible from outside.

3 Claims, 6 Drawing Figures

WHEEL COVER FOR A VEHICLE

BACKGROUND OF THE INVENTION

The present invention relates to a wheel cover for a vehicle having a spoke-like pattern.

Such a wheel cover conventionally includes separate radially outer and inner peripheral portions and spokes which are made of metallic wire, e.g. stainless steel wire, and assembled between and connected to the outer and inner peripheral portions. Such a wheel cover necessitates a number of parts and steps for the manufacture and assembly of the parts so that it is difficult to reduce the weight and cost. Further, the spokes tend to loosen due to vibration and shocks during driving of the vehicle, which causes undesirable rattling of the wheel cover.

SUMMARY OF THE INVENTION

An object of the present invention is to provide an improved wheel cover which eliminates the above mentioned disadvantages.

According to the present invention, there is provided a wheel cover which comprises a first cover member including a first outer peripheral portion, a first inner peripheral portion and a plurality of radially extending first spoke portions located between and connected to the first outer and inner peripheral portions, said portions of the first cover member being formed integrally; a second cover member including a second outer peripheral portion, a second inner peripheral portion and a plurality of radially extending second spoke portions located between and connected to the second outer and inner peripheral portions, said portions of the second cover member being formed integrally; said first cover member being disposed on the axially rear side of the second cover member coaxially thereto, with the first outer and inner portions in abutting engagement with the second outer and inner portions, respectively, leaving a space between the first and the second spoke portions; said first and second cover member being connected with each other such that the first spoke portions are visible from outside through uninterrupted spaces between the second spoke portions.

As the first and the second cover members of the wheel cover are integrally molded by injection moulding a suitable plastic material, or casting or die-casting suitable light-metal alloy, the number of parts and the assembling cost can be greatly reduced and the loosening of the spokes and rattling of the wheel cover during driving can be effectively eliminated. Further, by forming a space between the first and second spoke portions, an improved appearance can be obtained.

Preferably, the first outer and inner peripheral portions and the first spoke portions of the first cover member are formed integrally on the axial front surface of an annular or generally circular base plate. Because of this, the moulding is easily effected and the strength of the first cover member is improved.

According to an alternative embodiment of the present invention, the first inner peripheral portion of the first cover member is annular, which is connected to the first outer peripheral portion by the first spoke members only.

Preferably, the spoke portions of each cover member cross each other between the respective outer and inner peripheral portions to provide improved appearance and strength.

Preferably, the cross points of the first spoke portions of the first cover member are generally at the circumferential mid points between two adjacent cross points of the second spoke portions of the second cover member. Because of this, the spoke portions of the cover members are arranged quite in order so that a refined appearance is obtained.

Preferably, the spoke portions of each cover member which cross each other are axially staggered so as to provide a solid impression of actual spokes.

Preferably, each spoke portion of at least the second cover member includes axial front and rear sections, the width of the front section being greater than the width of the rear section in order to minimize formation of fins along the parting lines of the moulds. Further, such fins are not visible from outside.

Other features and advantages of the present invention will become apparent with reference to the following detailed description of the preferred embodiments, by way of example, shown in the attached drawings.

DETAILED DESCRIPTION OF THE PREFERRED EMBODIMENTS

Figure 1:
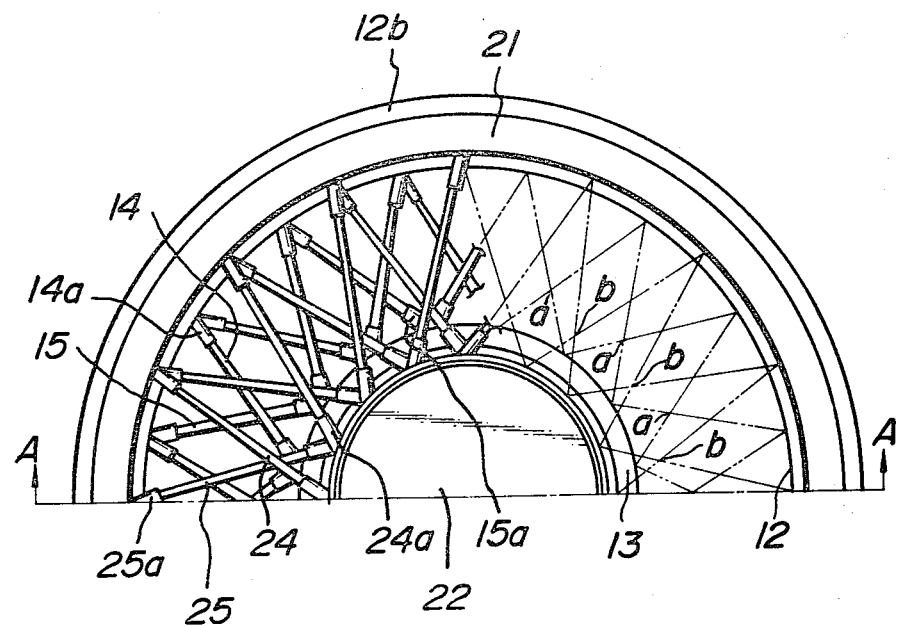
FIG. 1 is a plan view of a wheel cover according to the present invention.
Figure 2:
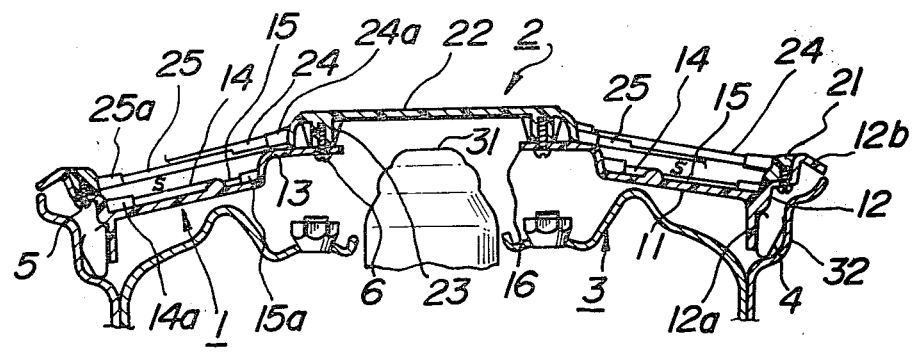
FIG. 2 is a sectional view taken along the line A—A of FIG. 1.

FIGS. 1 and 2 show a wheel cover for a vehicle according to one embodiment of the present invention. The wheel cover comprises a first cover member 1 which is mounted on a rim 32 of a road wheel 3 through a plurality of clips 4, and a second cover member 2 which is connected to the first cover member 1 by a plurality of bolts 5 and 6.

The first cover member 1 comprises a generally annular disc-like base plate 11 which has a central opening 16 corresponding to a hub 31 of the wheel 3. An outer peripheral portion 12 of the base plate 11 is formed with a ring-like clip mount 12a for mounting the clips 4 and a generally annular flange portion 12b which extends as far as the outer edge of the rim 32. An inner peripheral portion 13 is integral with the base plate 11 and extends radially inwards from the inner edge of the base plate 11. Front side surface of the base plate 11 is formed with spoke portions 14 and 15 which are integral with the base plate 11 and project frontward from the generally frustoconical surface of the base plate 11. All the elements of the first cover member 1 are integrally formed e.g. by injection moulding of suitable plastic material.

The second cover member 2 comprises an annular outer peripheral portion 21 which fits in the stepped portion of the outer peripheral portion 12 of the first cover member 1, a disc-shaped inner peripheral portion 22 which covers the central opening 16 and part of the inner peripheral portion 13 of the first cover member 1, and a plurality of spoke portions 24 and 25 which are connected with and extend between the outer and inner peripheral portions 21 and 22. All the elements of the second cover member 2 are also integrally formed e.g. by injection moulding of suitable plastic material. The outer peripheral portion 21 is formed with a plurality of inside threads for the bolts 5, while the inner peripheral portion 22 is provided with a plurality of embosses 23 having inside threads for the bolts 6.

The first and the second cover members 1 and 2 thus formed are superimposed with each other at the outer peripheral portions 12 and 21 and the inner peripheral portions 13 and 22 leaving a space S between the spoke portions 14 and 15 and the spoke portions 24 and 25. The bolts 5 and 6 connect the first and second cover members 1 and 2 to form a complete wheel cover which is mounted to the wheel 3 by the clips 4.

Figure 3:
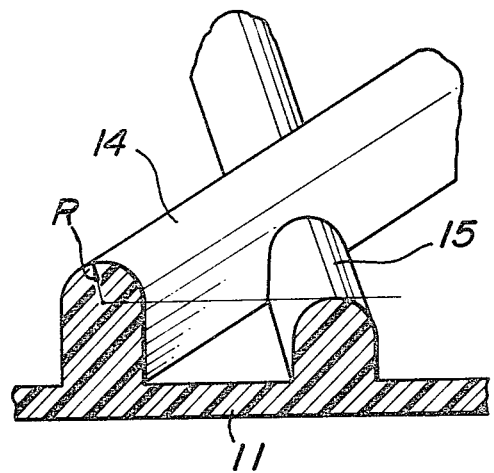
FIG. 3 is an enlarged perspective view, partly in section, of the spoke portion of a first cover member shown in FIG. 1.

Referring now to FIGS. 1 to 3, the spoke portions 14 and 15 are substantially rod-like portions having an inverted U-shaped cross section. The flat surface of the U shape is on the front frustoconical plane of the base plate 11. The spoke portions 14 and 15 cross each other in an axially staggered or offset relation between the outer and inner peripheral portions 12 and 13. In other words, the height of the spoke portion 14 is higher than that of the spoke portion 15, as shown in FIG. 3. The center of curvature of the spoke portion 14 is as high as, or slightly higher than, the top or front end surface of the spoke portion 15. Thus, as shown in FIG. 1, both side edges of the spoke portion 14 are neither interrupted or constricted at the cross point when seen from the front so that a refined appearance is available.

Figure 4:
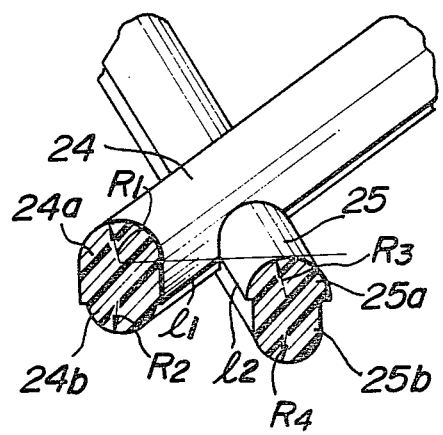
FIG. 4 is an enlarged perspective view, partly in section, of the spoke portions of a second cover member shown in FIG. 1.

The spoke portions 24 and 25 of the second cover member 2 are shown in FIGS. 1, 2 and 4. The spoke portions 24 and 25 are rod-like portions having a cross section of a generally elongated circle. The spoke portions 24 and 25 cross each other in a staggered relation between the outer and inner peripheral portions 24 and 25. As shown in FIG. 4, the spoke portions 24 and 25 are formed by front side sections 24a and 25a and rear side sections 24b and 25b, respectively. The width of the front side section 24a is larger than that of the rear side section 24b, as to the spoke portions 24. Similarly, the width of the front side section 25a is larger than that of the rear side section 25b, as to the spoke portions 25. Thus, the radius $R_1$ of the front side section 24a is larger than the radius $R_2$ of the rear side section 24b, and the radius $R_3$ of the front side section 25a is larger than the radius $R_4$ of the rear side section 25b. Consequently, fins which may be formed along the parting lines of the injection moulds are not visible from outside. Further, an alignment error between the cavity and the core can be easily absorbed, so that the manufacture of the moulds is relatively easy.

The thickness of the front side section 24a is larger than that of the rear side section 24b as to the front spoke portion 24, and the thickness of the front side section 25a is smaller than that of the rear side section 25b as to the rear spoke portion 25. The center of the radius $R_1$ of the front side section 24a is generally as high as, or slightly higher than, the top edge of the rear spoke portion 25. The border lines $l_1$ and $l_2$ between the front and rear side sections 24a and 24b and between the front and rear side sections 25a and 25b are on one common plane which is the parting plane between the cavity and core of the moulds.

Because of this, the moulds can be very easily manufactured. Also, as both side edges of the spoke portion 24 are not constricted at the cross point in the front view, the appearance is improved.

The spoke portions 14 and 15 of the first cover member 1 and the spoke portions 24 and 25 of the second cover member 2 each have a thickness which decreases from the radially inner location to the radially outer location to further improve the appearance. Differences in the height between the spoke portions 14 and 15 and between the spoke portions 24 and 25 are marked to further improve the solid appearance. Both end portions 14a, 15a, 24a and 25a of the spoke portions 14, 15, 24 and 25 are of larger diameter as shown in FIGS. 1 and 2 to provide an impression of actual spokes and to increase the strength.

As shown in FIG. 1, the first cover member 1 is mounted to the second cover member 2 such that the cross points a between the spoke portions 14 and 15 of the first cover member 1 are positioned substantially at the mid points in the circumferential direction of the cross points b between the spoke portions 24 and 25 of the second cover member 2. Thus, the arrangement of the spoke portions is in good order so that a refined appearance is obtained, and the strength distribution against the external force is also improved.

The spoke portions 14 and 15 are preferably coloured in a colour different from that of the back surface. For example, the spoke portions 14 and 15 may be of bright metallic colour and the base plate 11 may be a lusterless black. Due to this, the spoke portions 14 and 15 are visually emphasized.

Figure 5A:
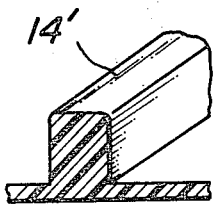
FIGS. 5A and 5B are enlarged perspective views, partly in section, of another embodiment of the spoke portions of the first and second covers members, respectively.
Figure 5B:
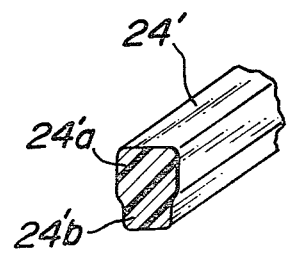

In the embodiment shown in FIGS. 1 to 4, the cross section of the spoke portions 14 and 15 of the first cover member 1 is generally of inverted U-shape while the cross section of the spoke portions 24 and 25 of the second cover member 2 is generally of elongated circular shape. FIGS. 5A and 5B show another embodiment of the spoke portions of which the cross section is generally rectangular. In this case, as shown in FIG. 5B, the front side section 24'a of the spoke portion 24' of the second cover 2 may have a wider width than the rear side section 24'b.

The inner peripheral portion 22 of the second cover member 2, which was shown as being disc-shaped, may be annular. A first cover member 1 without the base plate 11 may be used, of which rod-shaped spoke portions 14 and 15 serve to solely connect the outer and inner peripheral portions as in the second cover member.

The first and second cover members 1 and 2 may preferably be formed by injection moulding of suitable plastic material. However, the first and second cover members 1 and 2 may be formed by casting or die-casting of suitable light metal alloy, e.g. magnesium alloy, aluminum alloy or zinc alloy.

It will be appreciated that the wheel cover for a vehicle according to the present invention is formed of the first and second cover members 1 and 2 each formed integrally as a one-piece structure and axially superimposed on each other. Thus, a time consuming assembly process of assembling a number of spokes is completely eliminated so that the wheel cover is very easily manufactured. Also, the number of parts is greatly reduced and the parts stock control is very easy. As the spoke portions of the first cover member are visible between the spoke portions of the second cover member, the appearance of the wheel cover is very refined. The present invention completely eliminates loosening of the spokes due to vibration and shocks during driving of the vehicle causing undesirable rattling of the wheel cover.

What is claimed is:

1. A wheel cover of a vehicle wheel, which comprises:
    a first cover member including a first outer peripheral portion, a first inner peripheral portion and a plurality of radially extending first spoke portions located between and connected to the first outer and inner peripheral portions, said portions of the first cover member being formed integrally;
    a second cover member including a second outer peripheral portion, a second inner peripheral portion and a plurality of radially extending second spoke portions located between and connected to the second outer and inner peripheral portions, said portions of the second cover member being formed integrally;
    said first cover member being disposed on the axially rear side of the second cover member coaxially thereto, with the first outer and inner portions in abutting engagement with the second outer and inner portions, respectively, leaving a space between the first and the second spoke portions;
    said first and second cover member being connected with each other such that the first spoke portions are visible from outside through uninterrupted spaces between the second spoke portions;
    the spoke portions of each cover member crossing each other at cross points between the respective outer and inner peripheral portions, the spoke portions of each cover member which cross each other being axially staggered;
    the cross points of the spoke portions of the first cover member being circumferentially at mid points between two neighboring cross points of the spoke portions of the second cover member;
    each spoke portion of at least the second cover member including an axial front and rear section, the width of said front section being greater than the width of the rear section, the boundary lines between said front and rear sections of the spoke portions lying axially in front at said cross points, and the boundary lines between said front and rear sections of the spoke portions lying axially behind at said cross points, being in a common plane; and
    means for attaching said first and second cover members to said wheel.

2. A wheel cover as claimed in claim 1, wherein the first cover member further includes an annular base plate, said first outer and inner peripheral portions and the first spoke portions being integrally formed on the axially front surface of the base plate.

3. A wheel cover as claimed in claim 1, wherein each spoke portion of at least the second cover member has a cross section in the shape of a generally elongated circle, the center of radius of the front section of the spoke portions axially lying in front at said cross points being located at least as high as the axial front edge of the front section of the spoke portions lying axially behind at said cross points.

* * * * *